United States Patent [19]
MacKay

[11] Patent Number: 5,718,520
[45] Date of Patent: Feb. 17, 1998

US005718520A

[54] APPARATUS AND METHOD FOR MODIFYING A PRINT JOB TICKET

[75] Inventor: Mary K. MacKay, Webster, N.Y.

[73] Assignee: Xerox Corporation, Stamford, Conn.

[21] Appl. No.: 445,822

[22] Filed: May 22, 1995

[51] Int. Cl.⁶ .................................................. B41J 3/46
[52] U.S. Cl. ................................................ 400/61; 400/63
[58] Field of Search ................................. 400/61, 76, 63

[56] References Cited

U.S. PATENT DOCUMENTS

| | | |
|---|---|---|
| 4,941,057 | 7/1990 | Lehmbeck et al. |
| 5,164,842 | 11/1992 | Gauronski et al. ............ 358/401 |
| 5,170,340 | 12/1992 | Prokop et al. ................ 364/143 |

*Primary Examiner*—John S. Hilten
*Assistant Examiner*—Steven S. Kelley
*Attorney, Agent, or Firm*—Gary B. Cohen

[57] ABSTRACT

An apparatus for automatically modifying a print job ticket having a plurality of page tickets is provided. Each page ticket is programmed with one or more print job attributes and each print job attribute is associated with one or more print job characteristics. In practice, one or more values are assigned respectively to the one or print job characteristics. The print job attributes and print job characteristics are stored in memory as a set, and a portion of the set is scanned with a processor to determine each page ticket upon which a print job characteristic first value is located. A set of page tickets is selected from the page ticket(s) determined with the processor and, for at least a portion of the set of page tickets, one or more print job characteristic first values are changed to print job characteristic second values so that the need on the part of a printing system user to manually change print job characteristic first values to print job characteristic second values is minimized.

19 Claims, 16 Drawing Sheets

FIG. 6

APPARATUS AND METHOD FOR MODIFYING A PRINT JOB TICKET

The present invention relates generally to a technique facilitating the development of a print job for printing in a printing system and more particularly to an apparatus and method of automatically modifying one or more values of a job ticket for minimizing an amount of effort required on a part of a printing system user.

In a digital printing system, of the type sold by Xerox Corporation under the trademark of DocuTech, a job is provided to a printing subsystem, with an input section, in the form of a digital master. The master or "job" includes image data and a set of control signals representing programming instructions, the programming instructions being used to produce prints from the image data. In one example, the image data is provided by way of a rasterizing device, e.g. a scanner, or a network connection in the form of a page description language. In either event, the image data is accompanied by a job ticket which includes the various programming instructions required to produce the prints. The image data and the job ticket are stored in memory and, at print time, the image data, along with the corresponding instructions of the job ticket are transferred to a print queue where the job is eventually printed with a suitable print engine.

Examples of a "stand-alone" electronic copier and a network capable electronic copier are disclosed respectively in the following patents, the pertinent portions of which are incorporated herein by reference:

U.S. Pat. No. 5,164,842

Patentees: Gauranski et al.

Issued: Nov. 17, 1992

U.S. Pat. No. 5,170,340

Patentees: Prokop et al.

Issued: Dec. 8, 1992

Preferably, the job ticket is programmed, with a suitable user interface, at a workstation, communicating with the input section, or at the input section itself. In practice, the job ticket is characterized by a plurality of job attributes (e.g. print media, fonts, raster insertion, finishing) and each job attribute is associated with one or more job characteristics. For example, the print media attribute may be mapped to, among other job characteristics, size, type and color. Essentially, certain job characteristics are linked to one another so that a change of one job characteristic may dictate a change in a related job characteristic. During programming of a job ticket, a set of job characteristics is chosen and a corresponding set of values is provided for the job characteristic set. It is desirable to store the values in a database, indicating a page to which each job characteristic corresponds. Using this approach permits a user to construct a page ticket indicating the programming instructions for a given electronic page of the job.

Various conventional search and replace programs are available for use in word processing applications. For example, Xerox uses first and second search and replace programs, in their 6085 workstation, that permit automatic revisions of pre-specified terms. In the first search and replace program, a user accesses the program through a "FIND" key and designates that word which is to be searched and replaced. In the second search and replace program, a spell-checking routine searches for any irregularity in the spelling of a subject document. Once an apparent incorrect spelling is found by way of a search, the user may designate, from a pull-down menu, a replacement word to be provided for the misspelled word. In one example, if the user knows of an incorrect spelling, the program can be set to "AUTO-CORRECT" so that search and replace operations can be performed automatically for the incorrectly spelled word. Other search programs are particularly well suited for database searching. For example, Mead Data Corporation in their Lexis/Nexis (Lexis/Nexis is a trademark of Mead) database service permit searching in which a search is predicated on a search term including multiple words In the present approach to DocuTech (DocuTech is a trademark of Xerox), when a user wishes to edit a characteristic of a job, e.g. change a preprogrammed media type to a revised media type, it is necessary to print a proof copy of the job and locate, from a review of the proof copy, the pages at which a replacement is to be made. It is then necessary to manually reprogram all page tickets corresponding with the pages located via the review of the proof copy. It would be desirable to apply some of the concepts underlying the search and replace technology in a manner that minimizes user intervention in the process of job ticket editing. Since a job ticket may include linked values, it would be particularly desirable to provide a search and replace program in which multi-valued terms could be searched and multi-valued terms replaced.

In accordance with an aspect of the present invention there is provided a method particularly suited for use in a printing system with a memory and a print engine. A print job, with a programmed job ticket, is stored in the memory, the print job including a document being represented by image data. The job ticket includes a plurality of page tickets arranged in a numbered sequential order, each page ticket being associated with a set of printing instructions. The printing instructions includes print job attributes with each print job attribute being associated with one or more print job characteristics, each of the print job attributes and the print job characteristics being stored, as a set, in the memory. A first value is mapped to one of the print job characteristics and prints are produced at the print engine with the stored image data and printing instructions. The method, which automatically modifies one or more values of the job ticket to minimize an amount of effort required on a part of a printing system user, includes the following steps: a) scanning a portion of the set of print job attributes and print job characteristics; b) determining, during said a), each page ticket upon which the print job characteristic first value is located; c) buffering the number associated with each page ticket determined with said b); d) displaying the buffered page ticket numbers; e) with the displayed, buffered page ticket numbers of said d), selecting a set of page tickets; and f) for at least one portion of the set of page tickets, changing one or more print job characteristic first values automatically to one or more print job characteristic second values, wherein the need on the part of printing system user to manually change print job characteristic first values to print job characteristic second values is minimized.

These and other aspects of the invention will become apparent from the following description, the description being used to illustrate a preferred embodiment of the invention when read in conjunction with the accompanying drawings.

Figure 1:
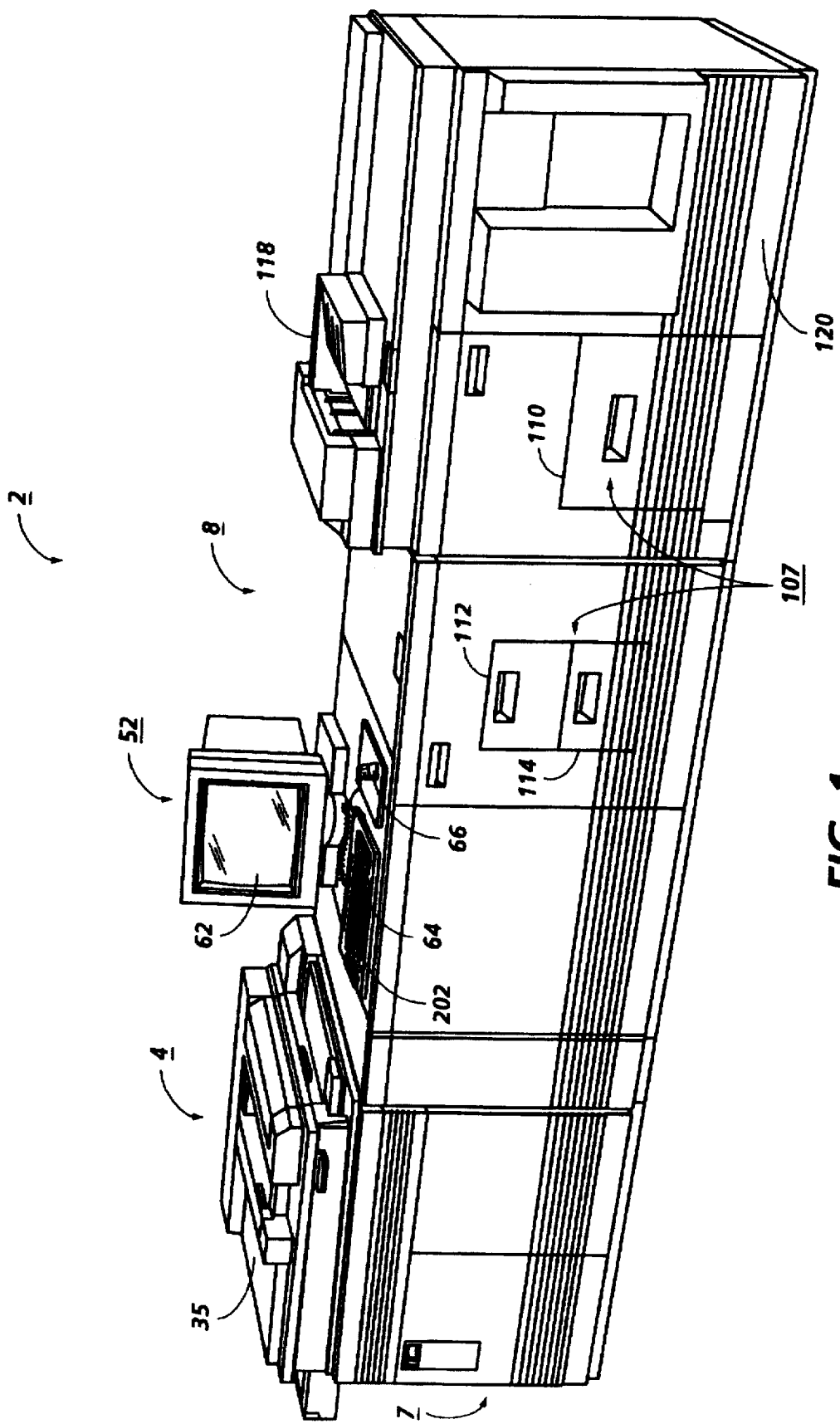
FIG. 1 is a perspective view depicting an electronic printer of the type adapted for use with a document proofing method of the present invention.
Figure 2:
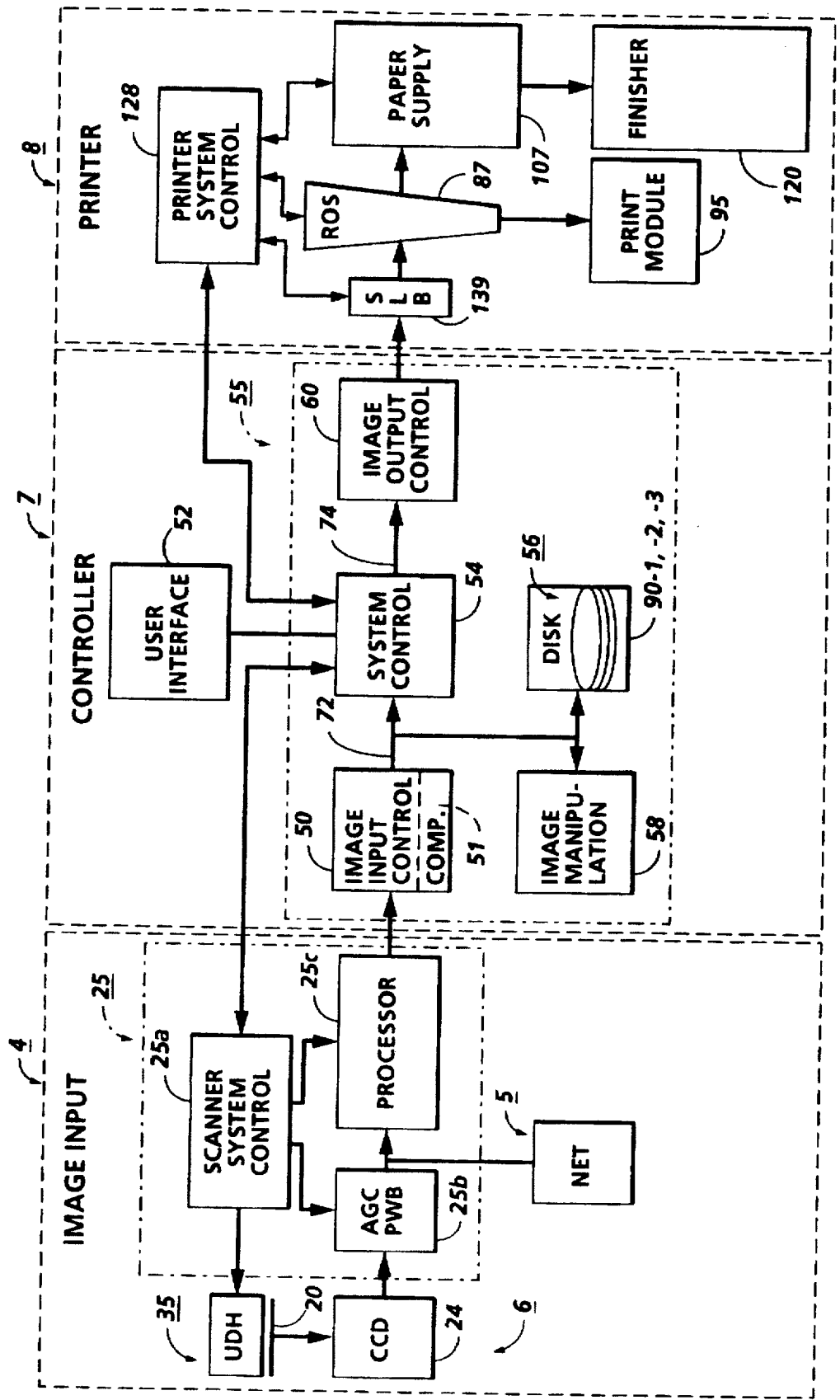
FIG. 2 is a block diagram depicting the major elements of the printer shown in FIG. 1.
Figure 3:
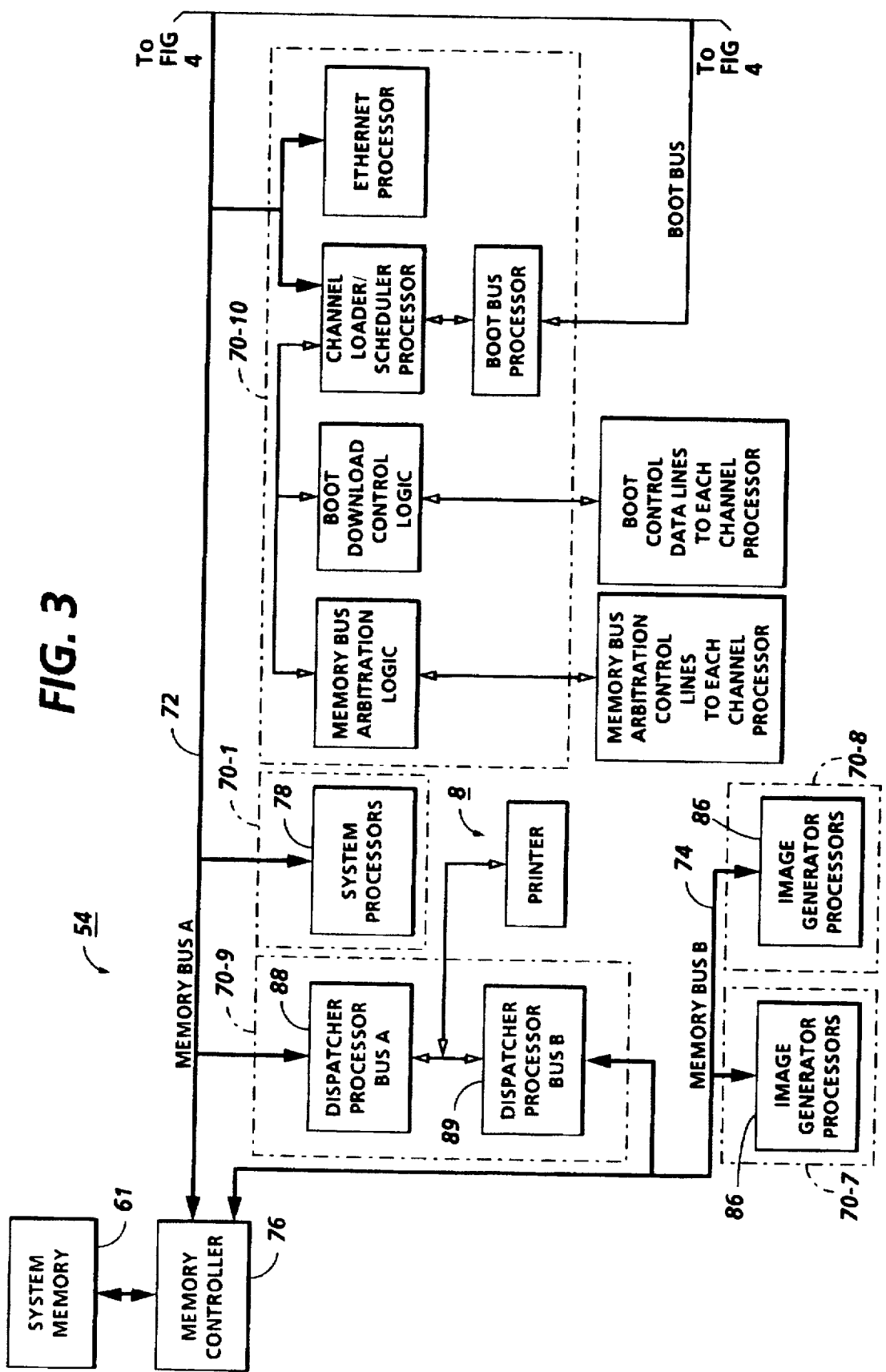
Figure 4:
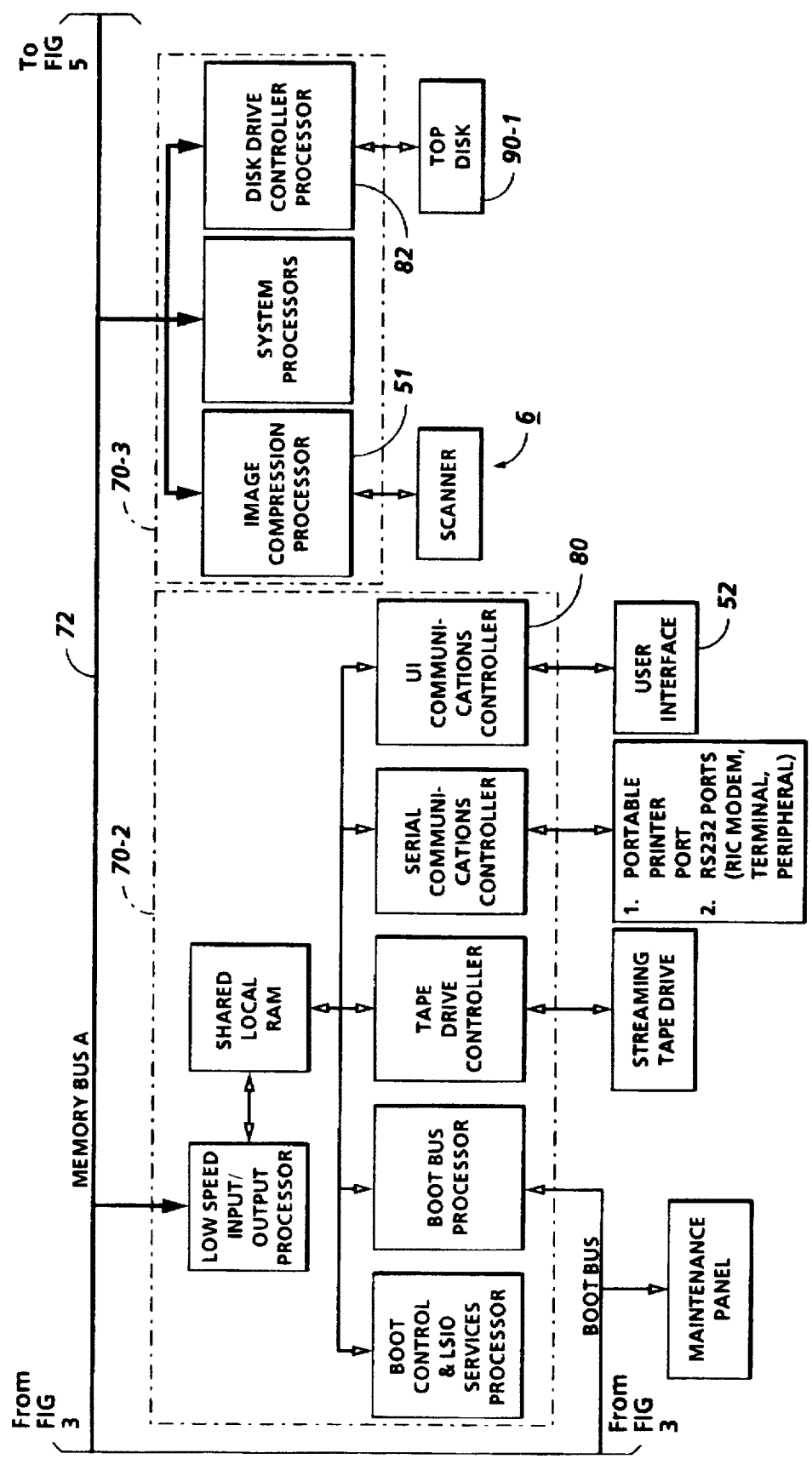
Figure 5:
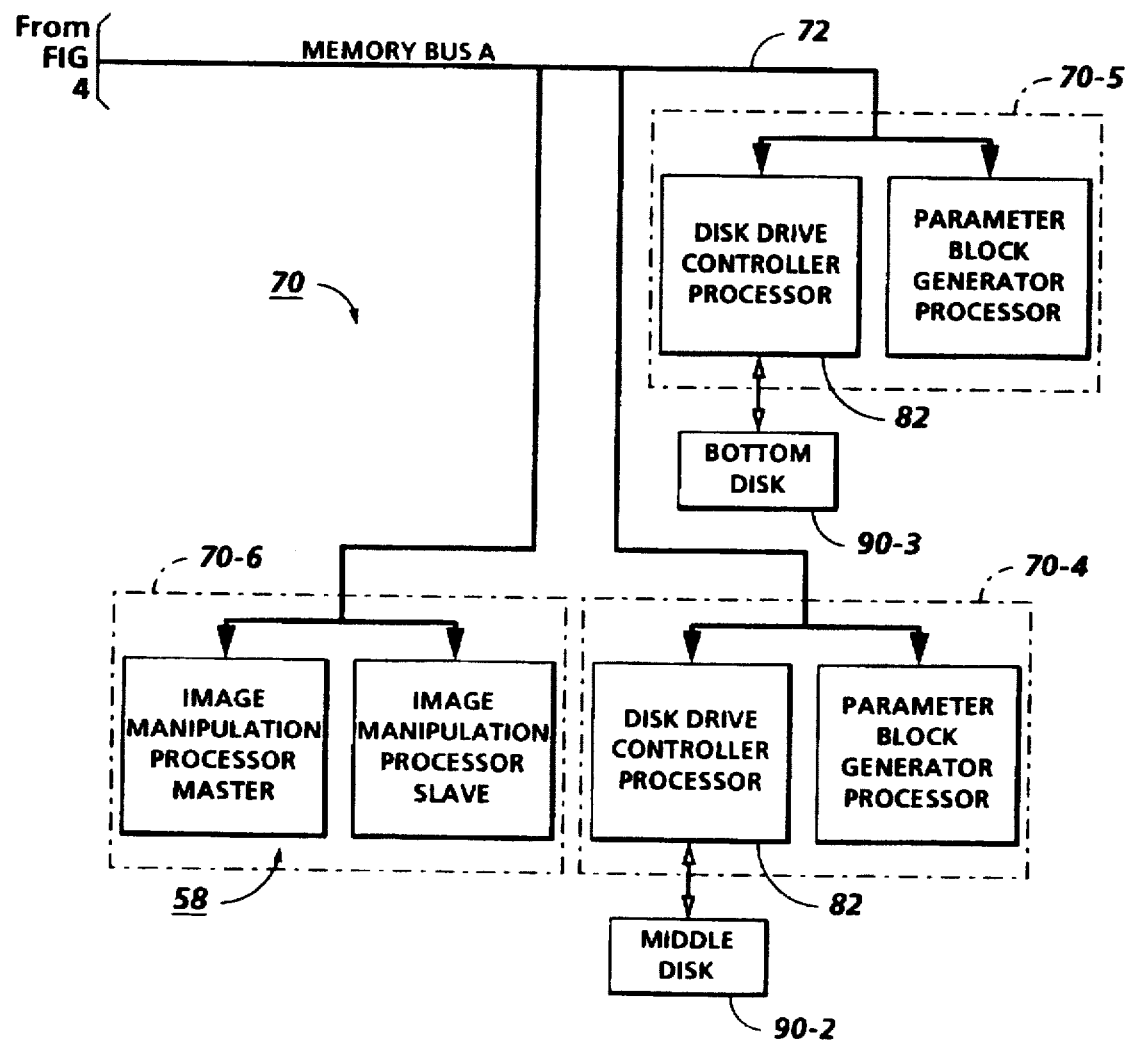
Figure 7:
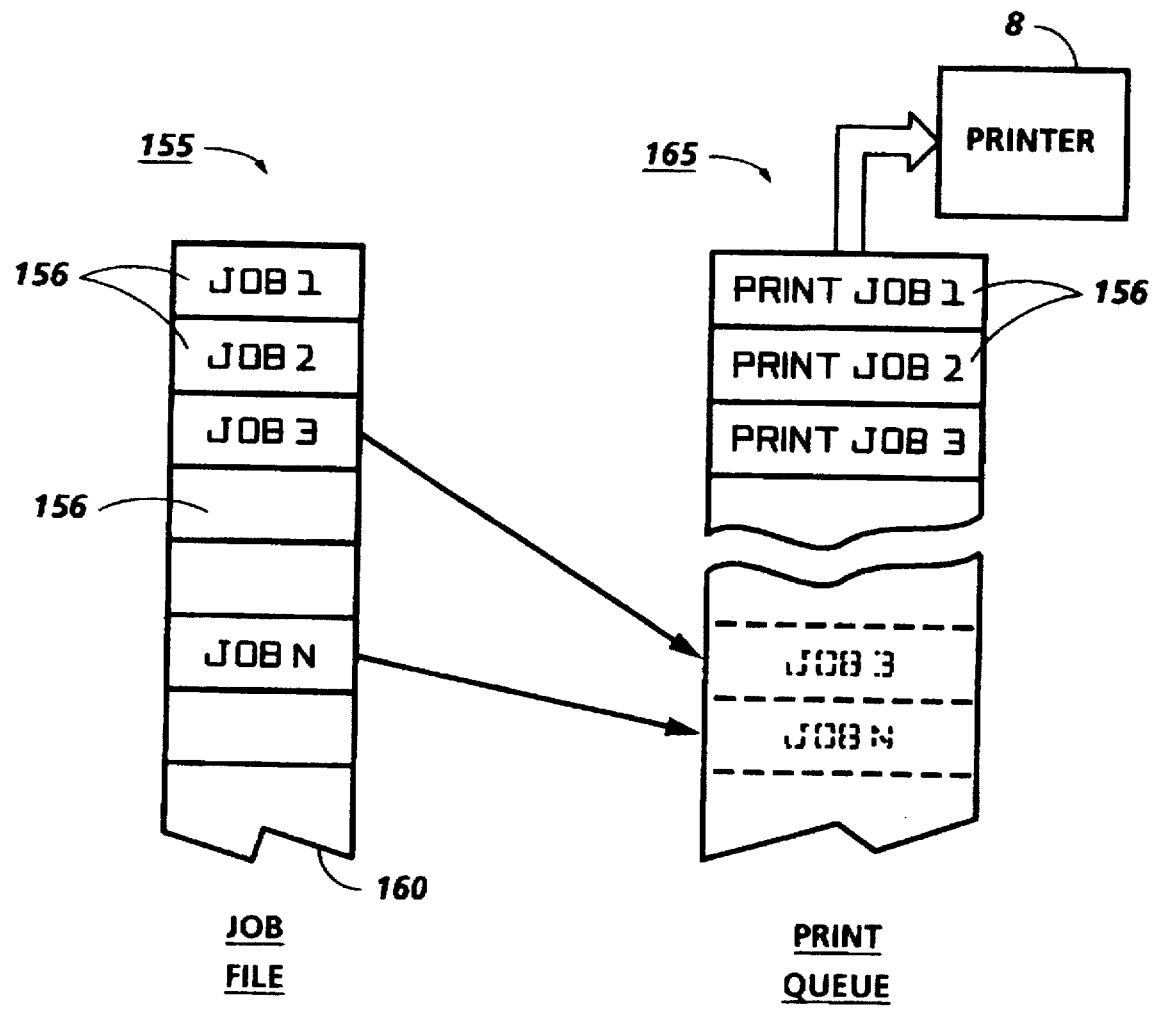
Figure 8:
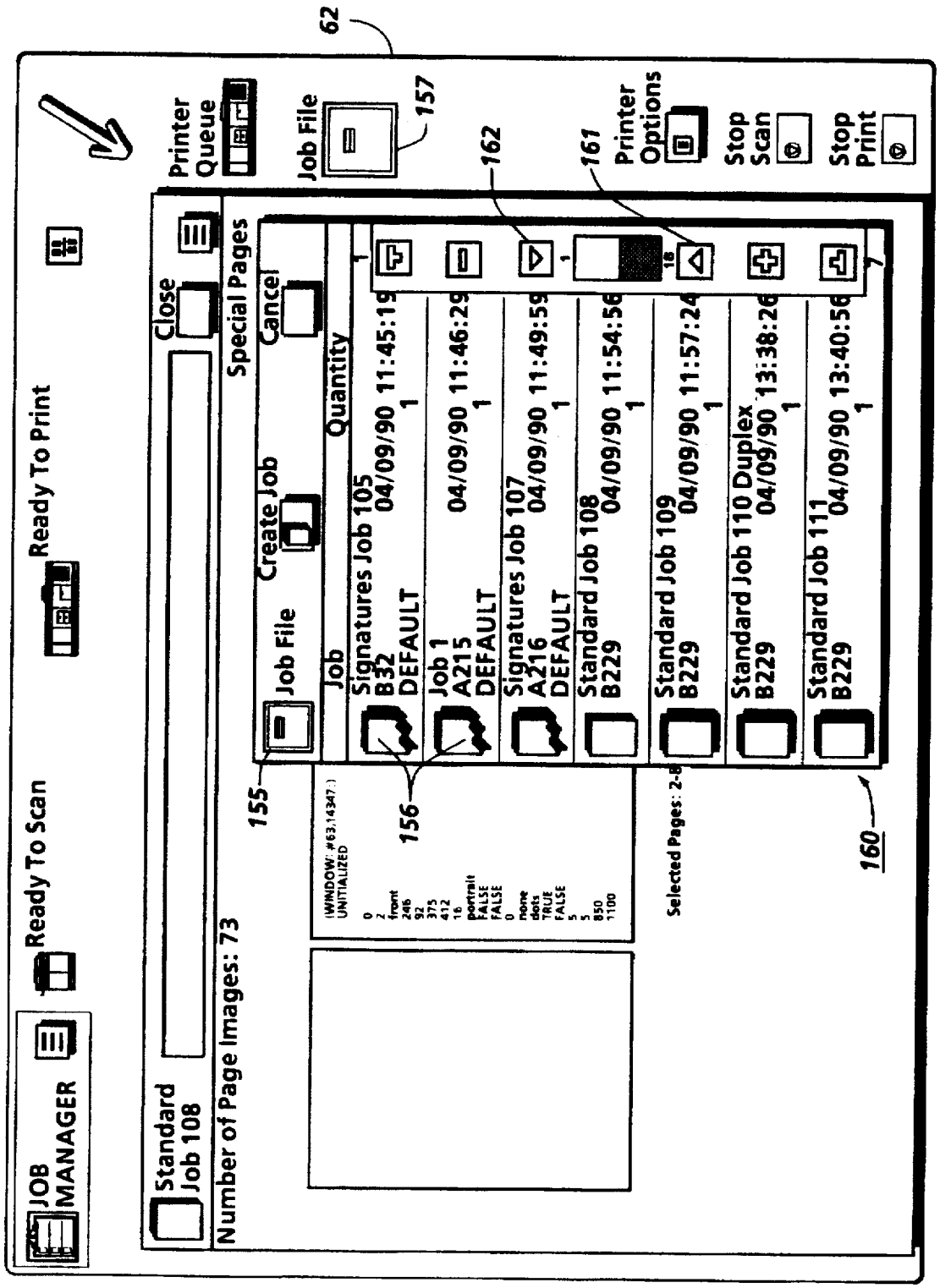
Figure 9:
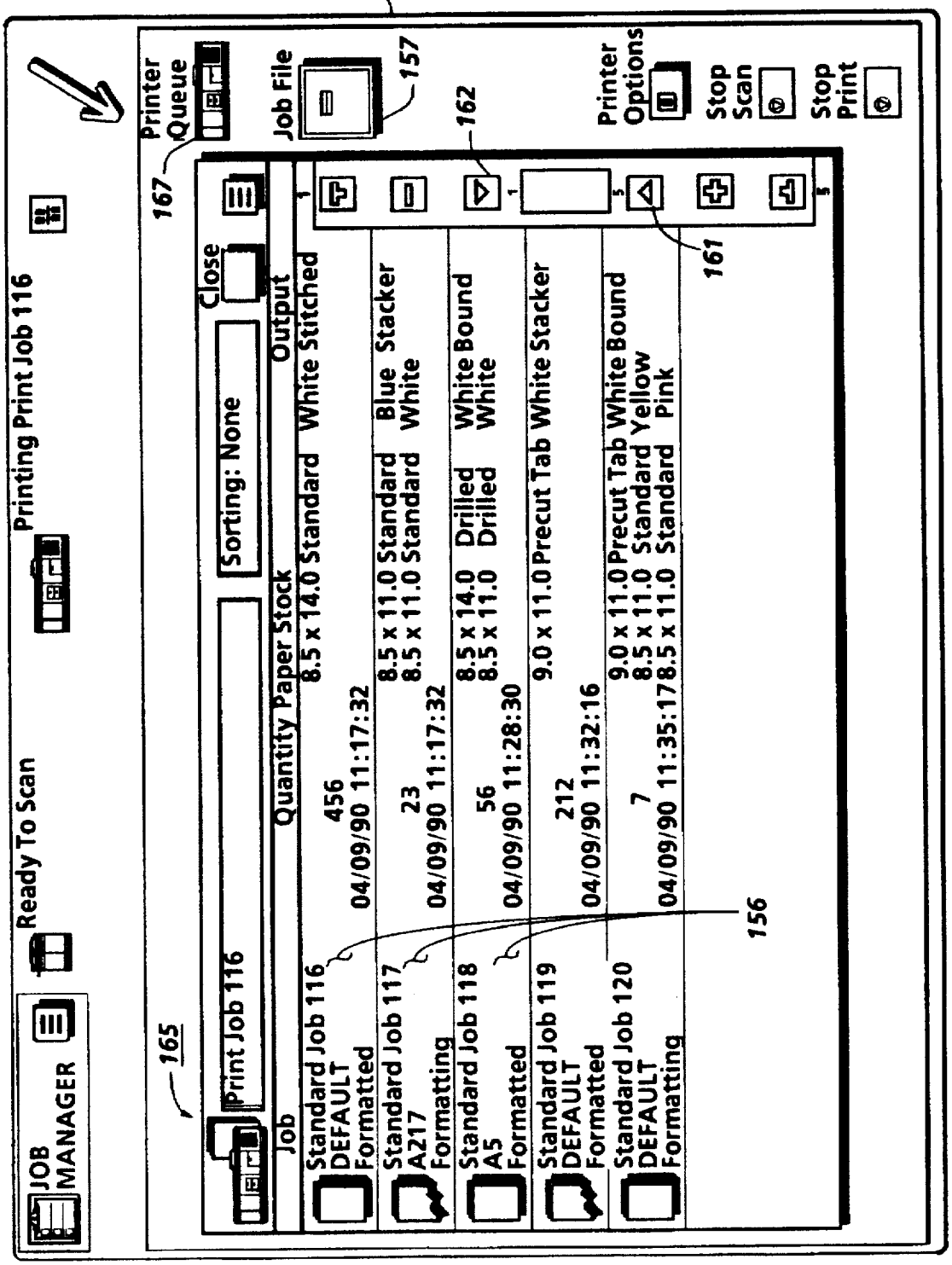
Figure 10:
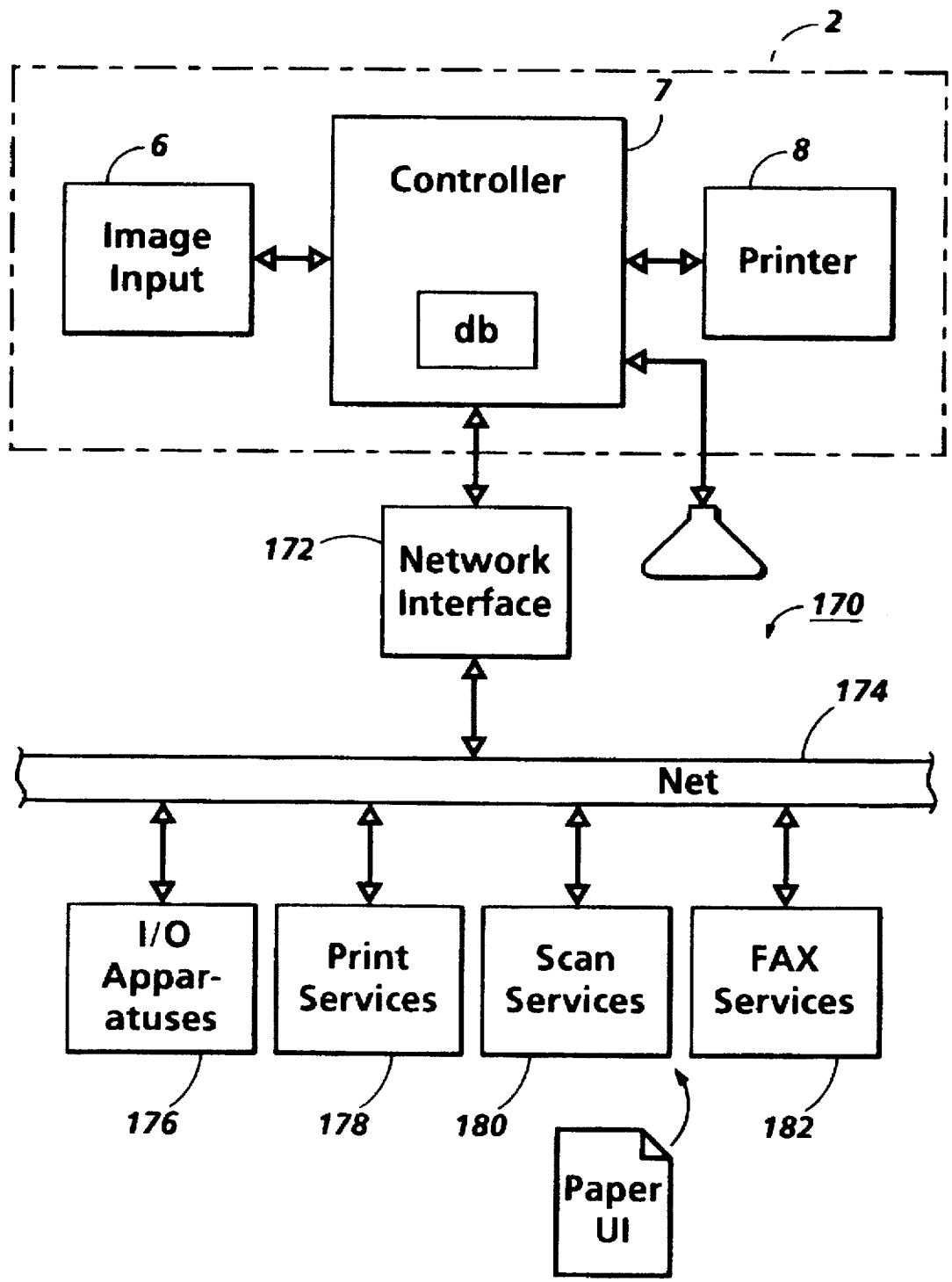
Figure 11:
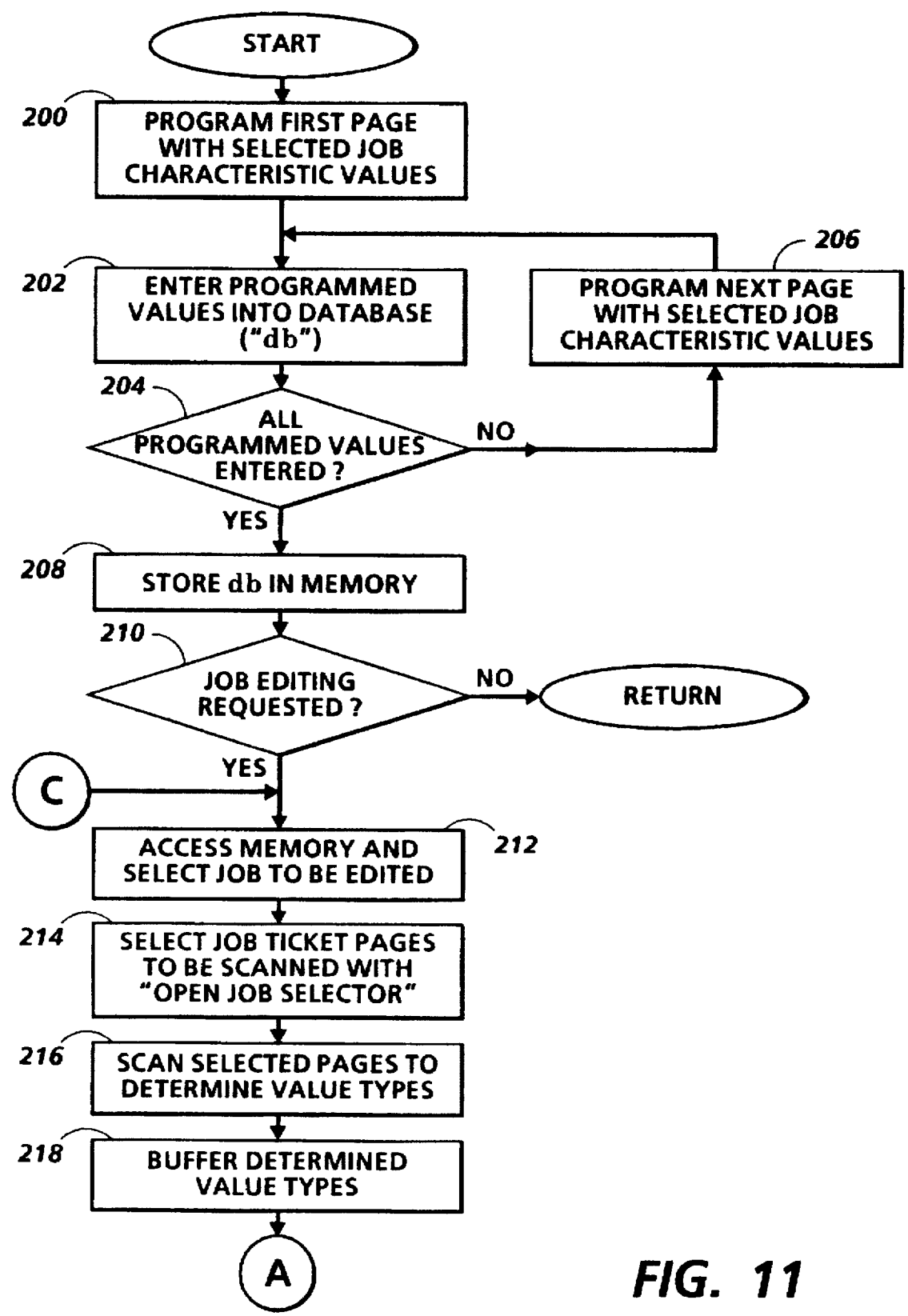
Figure 12:
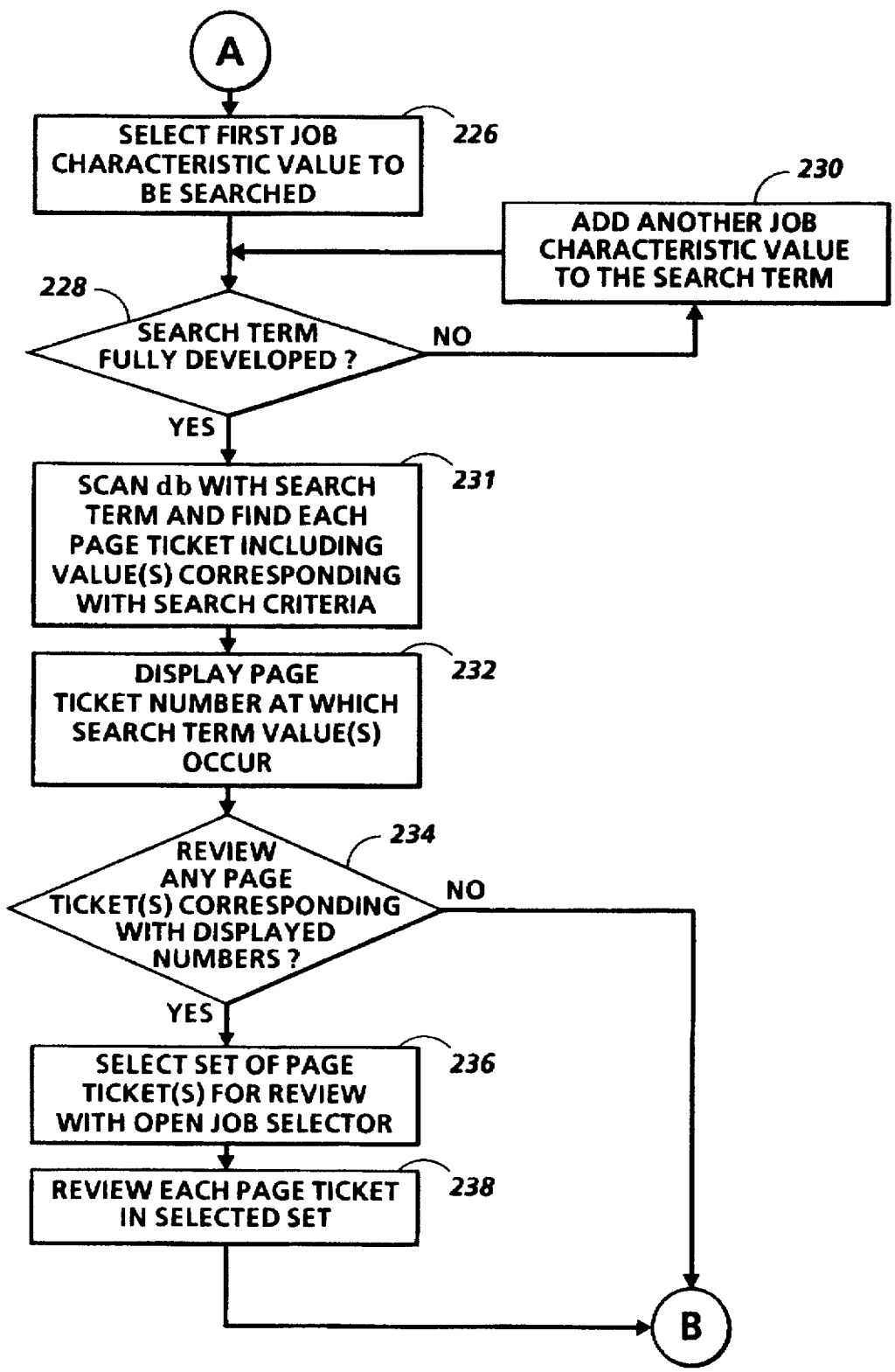
Figure 13:
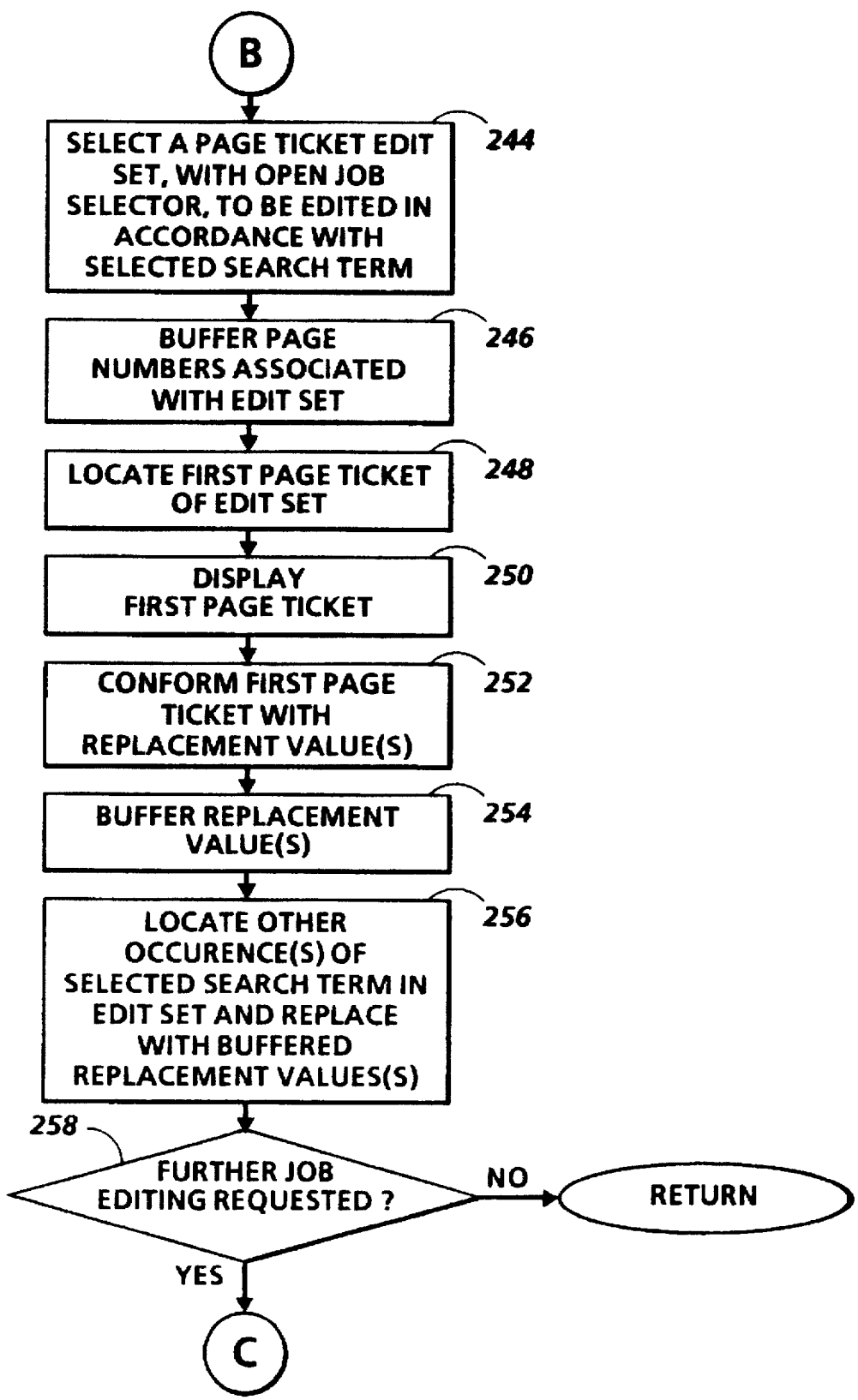
Figure 14:
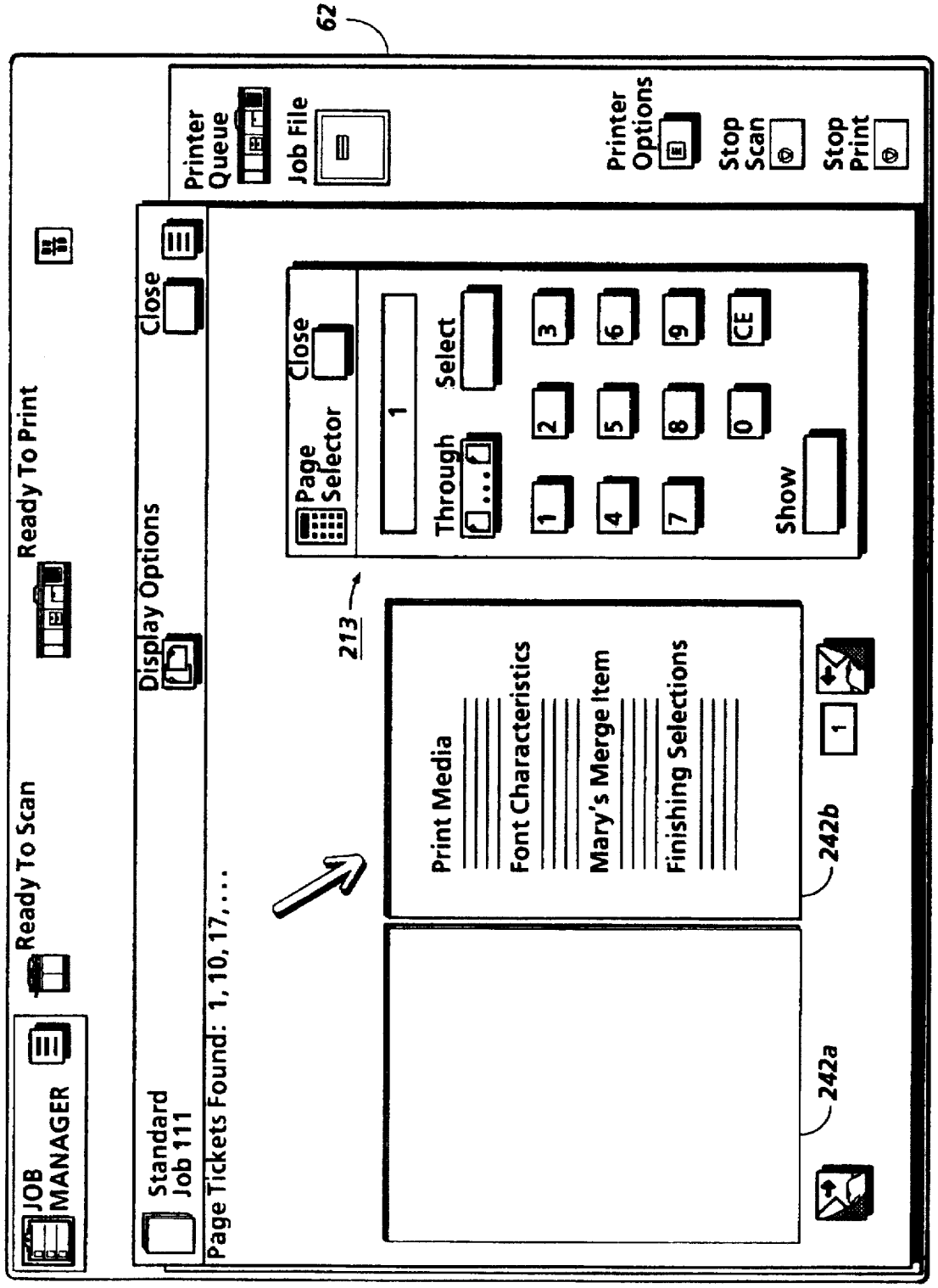
Figure 15:
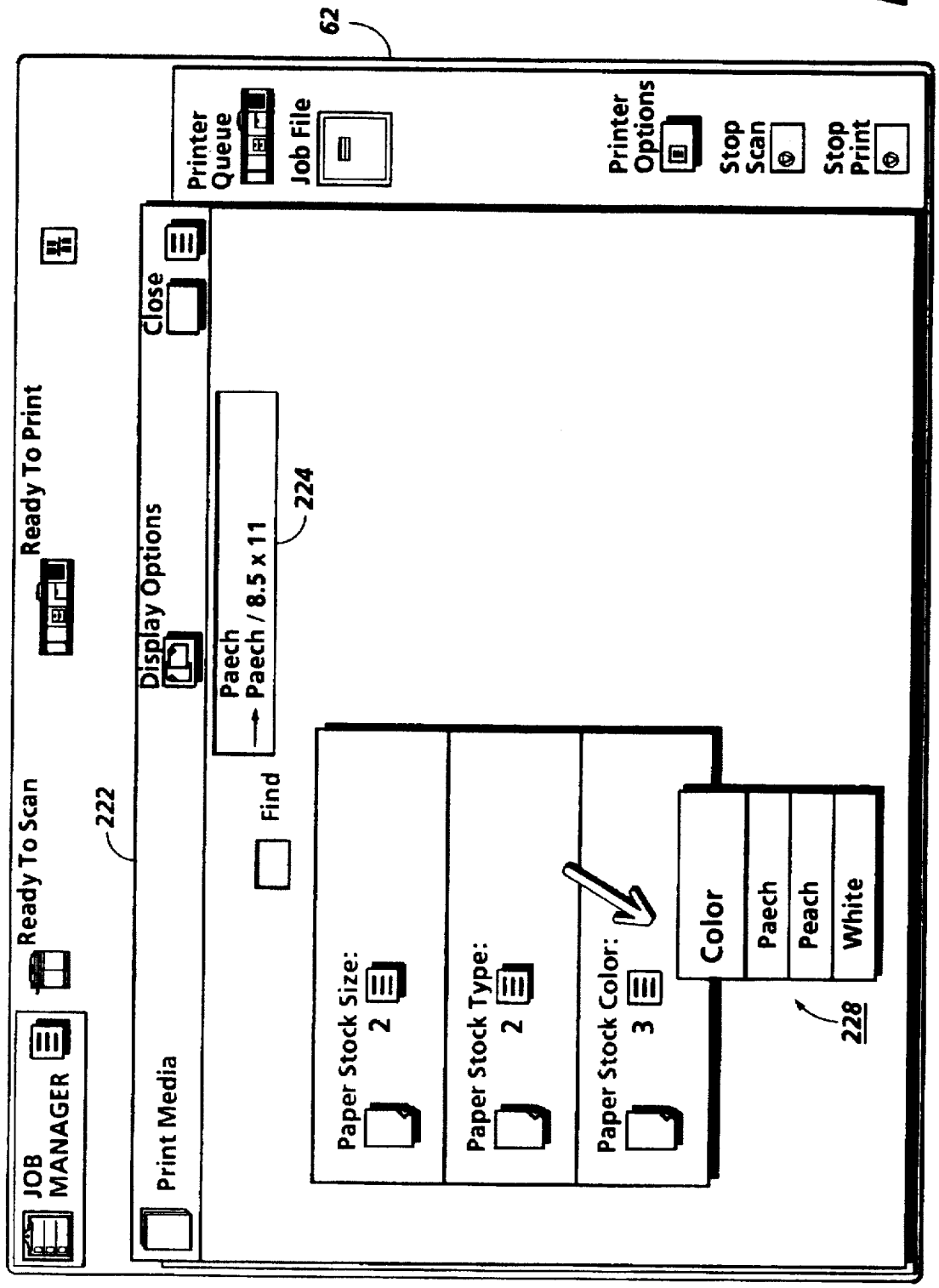
Figure 16:
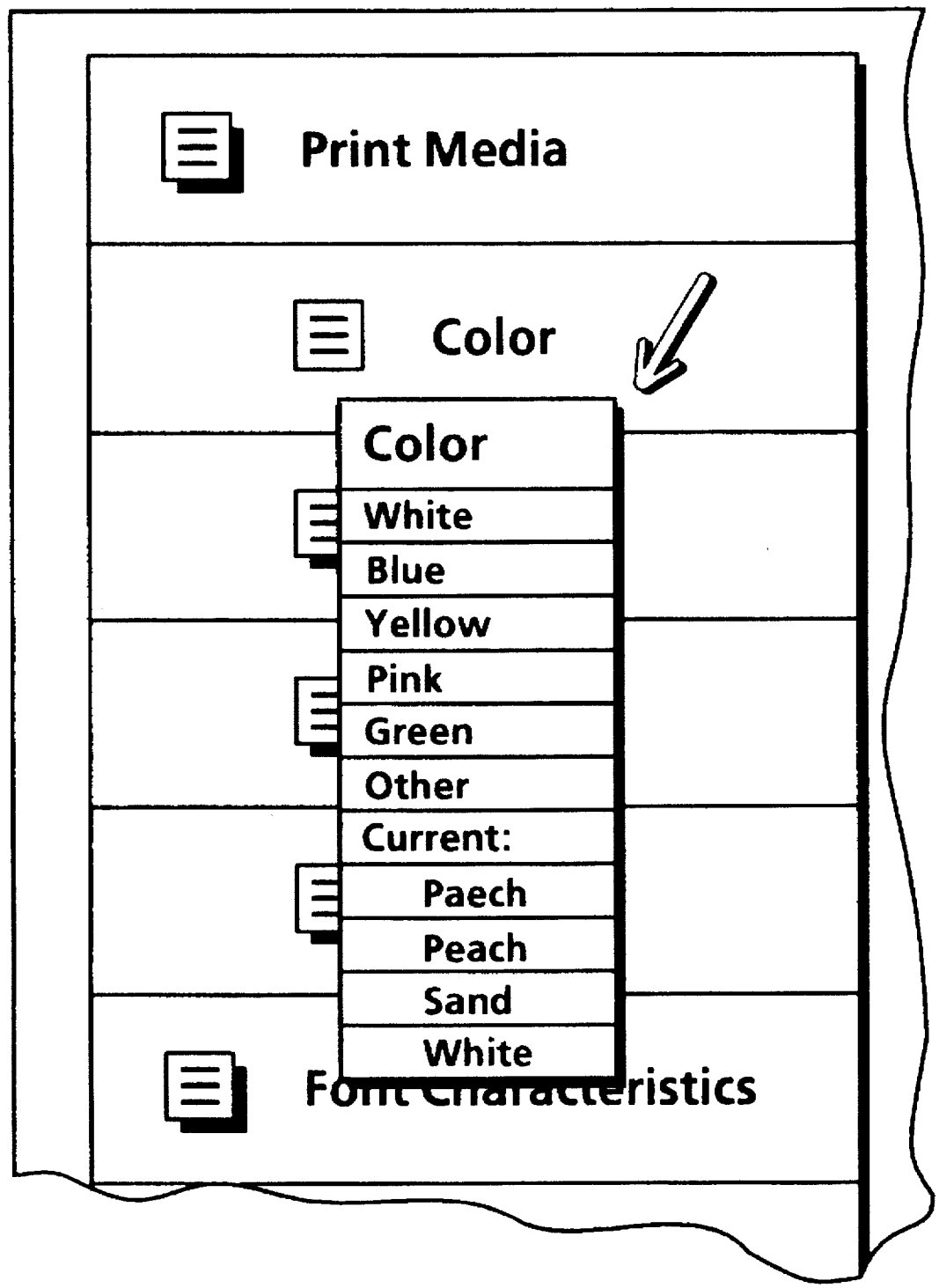

FIGS. 3-5 comprise a schematic block diagram showing the major parts of a controller for the printer shown in FIGS. 1 and 2;

Figure 6:
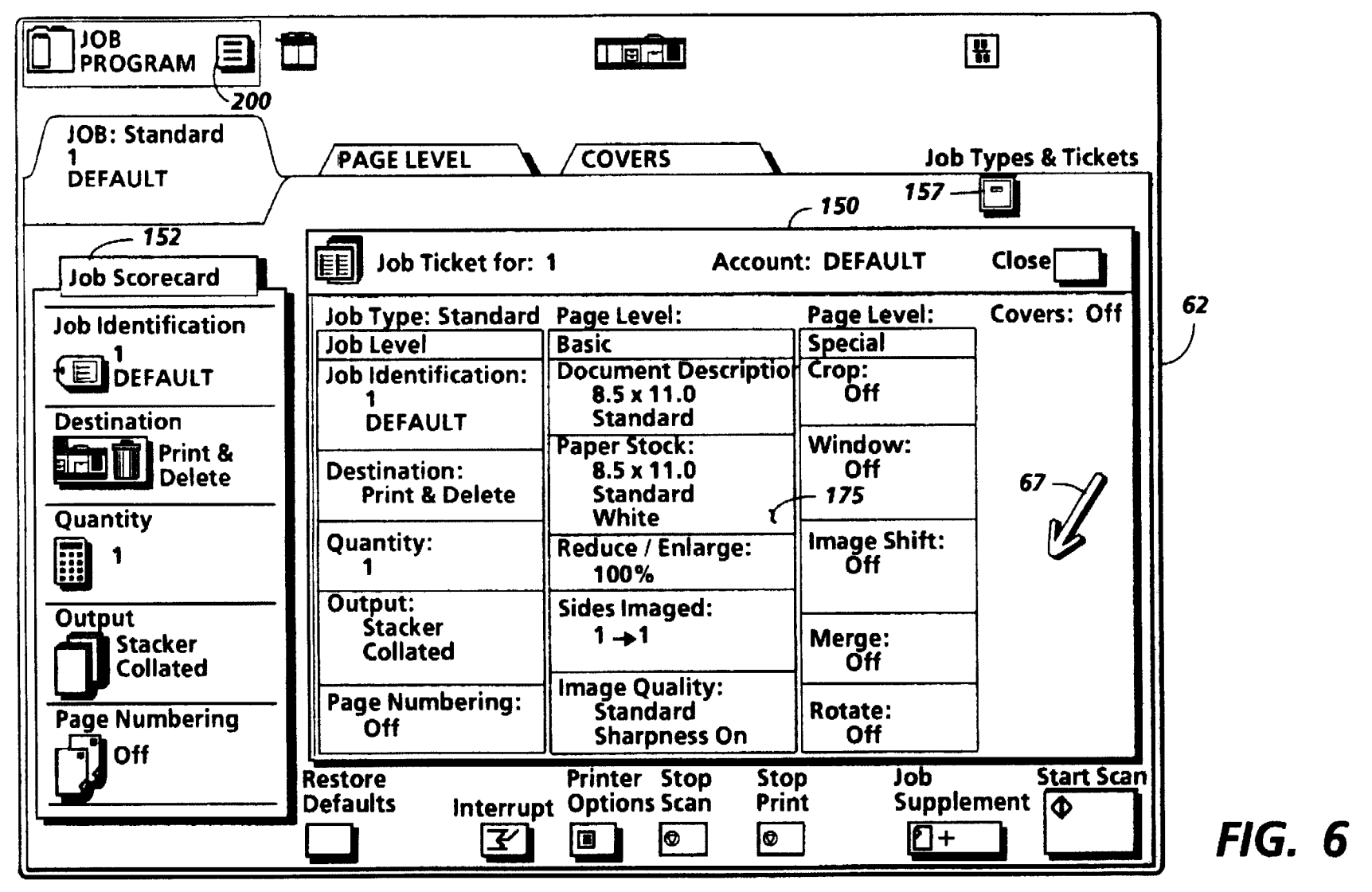

FIG. 6 is a view depicting an exemplary job programming ticket and job scorecard displayed on the User Interface (UI) touchscreen of the printer shown in FIG. 1, the job ticket and job scorecard being associated with a job to be printed;

FIG. 7 is a schematic view depicting a Job File and a Print Queue, each being associated with the controller of the printer of FIG. 1;

FIG. 8 is an elevational view of the User Interface touchscreen display depicting a Job File for storing typical jobs of the printing system;

FIG. 9 is an elevational view of the User Interface touchscreen display depicting a print queue of typical jobs to be printed;

FIG. 10 is a block diagram depicting a network printing system including the printing system of FIG. 2;

FIGS. 11-13 comprise a flowchart representing a technique for editing a job ticket; and FIGS. 14 and 15 respectively represent elevational views of dialogs used to implement the technique of FIGS. 11-13; and FIG. 16 is a partial, elevational, magnified view of the dialog of FIG. 15.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has, in one example, a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3A) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 4) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Referring to FIGS. 7 and 8, the image files are arranged in a job file 155, with the print jobs 156 numbered consecutively in the order in which the print jobs are scanned in or labeled as a system operator or network user may specify. Where the operator wishes to see the jobs currently residing in job file 155, as for example, to select jobs to be moved to the print queue for printing, a SYSTEM FILE icon 157 on touchscreen 62 is actuated. This displays a list 160 of the jobs 156 currently in the job file on screen 62, an example of which is shown in FIG. 8. Each job is identified by a descriptor showing the type of job, job number, number of prints, etc. By using up and down scrolling icons 161, 162, the operator can scroll the list of jobs where the number of jobs in the job file is too large to be simultaneously displayed on touchscreen 62.

Referring also to FIG. 9, to print a job 156, the job is copied into a print queue 165. A PRINTER QUEUE icon 167 on touchscreen 62, when actuated, displays the current print queue with a list of the jobs in the queue on touchscreen 62. Each job in print queue 165 has a displayed job descriptor identifying the job, job number, quantity to be printed, paper color, finishing type, etc. Print queue 165 is ordered by priority and time of arrival of the job in the print queue. Other priority orderings may be envisioned.

Referring to FIG. 10, the controller is coupled with network arrangement 170 by way of a network interface 172. The network interface 172 includes all of the hardware and software necessary to relate the hardware/software components of the controller 7 with the hardware/software components of the network arrangement 170. For instance, to interface various protocols between the server and the network arrangement, the network interface could be provided with, among other software, Netware® from Novell Corp.

To facilitate communication from both telecommunications and Facsimile ("FAX") sources, the network interface is preferably provided with dedicated hardware from New Voice Inc., designated by the Ser. No. "NV800". The NV800, which includes a dedicated processor, serving to implement a modem capability, is a multiplexing type device, i.e. a PBX adapted device, for facilitating the linking of multiple (e.g. 8) FAX/voice based lines to the controller 7. More particularly, the NV800 permits multiple users to access and use the controller 7 in a multiplexed fashion. Preferably, the New Voice system is used in conjunction with dedicated software referred to as "DAX" and manufactured by Ram Research. Additionally, as will appear from a discussion, it is desirable to provide the controller with the capability to record messages, via telephone or FAX, and store those messages on disk. This can be achieved readily through use of suitable hardware and software, such as the NV800 and DAX. A playback system, part of which includes a speaker 173, is preferably provided at the controller so that recorded messages can be accessed and listened to by an operator of the printing system 2. A playback system suitable for this use is produced by Sun Microsystems, Inc.

In the network arrangement 170, various I/O and storage devices are interconnected with a bus 174. In particular, the devices include, among others the following: I/O Apparatuses 176, Print Services 178, Scan Services 180 and FAX Services 182. In the present example a given I/O Apparatus may include a telephone and/or a workstation, such as any suitable PC compatible apparatus. In one example, the telephone, PC and FAX capability is provided by an integrated digital apparatus, such as that manufactured by Canon Corp. under the series name of "Navigator HD40". While in this example, the telephone is digitally based so that no interface, such as a modem, is required, in other examples the telephone could employ a suitable telecommunications interface without affecting the concept underlying the currently disclosed embodiment.

In one embodiment, the printing system 2 is a DocuTech® Network Printing System ("Network Printer") which prints jobs transmitted from one of the I/O apparatuses 176, such as a Xerox® 6085 workstation. In one embodiment, the Network Printer processes network jobs written in a page description language ("PDL") known as "Interpress" and as a prerequisite to printing the network job, the Network Printer decomposes the job from a high level primitive form to a lower level primitive form. The decomposition process is discussed in further detail in U.S. application Ser. No. 07/898,761 entitled "Apparatus and Method for Multi-Stage/Multi-Process Decomposing", filed on Jun. 12, 1992, by Bonk et al., the pertinent portions of which are incorporated herein by reference. In another embodiment the Network Printer is used, in conjunction with a DocuTech® Network Server, see Print Services 178, to print jobs written in, among other PDLs, Postscript®. The structure and operation of the DocuTech® Network Server may be more fully comprehended by reference to U.S. Pat. No. 5,226,112 to Mensing et al., the pertinent portions of which are incorporated herein by reference. Decomposed jobs are commonly stored, for output, in the job file 155 (FIG. 8) of the Network Printer and later transferred to the print queue 165 (FIG. 9) for printing.

Preferably, the Scan Service 180 includes a workstation and a scanner, provided in the form of a package. This sort of package is made available by Xerox Corporation in the form of a WG40 scanner coupled with a 6085 workstation. It will be appreciated that the Scan Service is preferably provided with Optical Character Recognition ("OCR") capability so that the user of the controller 7 can scan hard-copy, such as a sheet referred to as "Paper UI", for use by the controller 7. As is known, the Paper UI can be used to provide a controller with appropriate directives for a job, such as printing and/or finishing instructions. An example of Paper UI, and its application can be obtained by reference to U.S. Pat. No. 5,051,779 to Hikawa, the pertinent portions of which are incorporated herein by reference. Finally, the FAX Service 182 assumes the form of any suitable networked FAX device, such as the LAN FAX Service manufactured by Xerox Corporation under the 7032 series. Details regarding the coupling of a FAX component with a printing system can be found in U.S. Pat. No. 4,821,107 to Naito et al., the pertinent portions of which are incorporated herein by reference.

Referring to FIGS. 11–13, a technique for editing a job ticket is shown. In one example, the editing process includes generating a searchable database for each job ticket to be edited. Referring specifically to FIG. 11, the database generation process proceeds from a start step to step 200 where a user programs a first page with one or more selected job characteristic values through use of the job ticket 150 of FIG. 6. It will be understood by those skilled in the art that a job characteristic is a certain aspect of the job which serves to define how the job will be produced. More particularly, referring, as an example, to the dialog or job ticket of FIG. 6, a job will typically include an attribute, such as paper stock, and the attribute is associated with at least three job characteristics, namely size, type and color. The job characteristics are provided with respective values which, for the example of FIG. 6 are 8.5×11.0, Standard and White. As values are entered into the job ticket 150 (step 202) the values are entered in the database in a conventional manner. The steps 204 and 206 are employed to enter all values for each page ticket of a job ticket in the database. Upon entering all of the values in the database, the programmed job ticket is stored, by way of step 208 in, for example, the job file 155 of FIG. 7.

In the illustrated embodiment of FIG. 11, job characteristic values for a single job are entered into the database and job editing is thereafter requested. It will be appreciated that steps 200, 202, 204, 206 and 208 could be performed multiple times for multiple jobs before job editing is requested at step 210. For those situations in which job editing is requested, memory is accessed at step 212 and a user may select a job from the job file 155 (FIG. 7) to be edited. it will be appreciated that in some circumstances job editing may be performed on a job in the print queue 165. Additionally, the user may not wish to edit an entire job. Accordingly, the user dialog of FIG. 6 is employed to enter a job manager state (FIG. 14) where an "Open Job Selector" 213 is displayed. This open job selector, which is disclosed in U.S. Pat. No. 5,164,842 and employed in the Docutech printing system, is used, via step 214, to select job ticket pages to be scanned. In the preferred embodiment, the selected pages are scanned, with step 216, to determine the value types programmed in the selected job ticket pages. The determined value types are then buffered by way of step 218.

Referring to FIGS. 12 and 15, the user proceeds with the editing process by displaying a "blank job ticket" 222, which blank ticket preferably displays the values available for a selected group of job characteristics. It should be recognized that while the blank ticket 222 shows three job characteristics associated with the print media attribute, in practice, a plurality of blank tickets would be available for a job, which blank tickets would provide specific information regarding, among other job characteristics, font characteristics, merge items characteristics and finishing characteristics. In the example of FIG. 15, a search term is generated for media type only; however, a job characteristic value could, in another example, be coupled with a job characteristic value having an attribute other than print media. A search term, which is displayed in window 224, is obtained initially by use of step 226 and an appropriate pull down menu 228. In the example of FIG. 15, a search is to be performed for all 9×11 paper designated with the color "Paech". That is a composite search term is developed by looping through steps 229 and 230 so that a search term of 2 values is composed.

In practice, the steps 226, 229 and 230 are implemented by choosing Paech from one pull down menu and the size 9×11 from another pull down menu. It will be appreciated, however, that multiple blank tickets could be used to mix plural job characteristic values corresponding with plural attributes. For instance, to edit a document incorrectly programmed for "duplexed transparency", a composite term including a job characteristic associated with media and a job characteristic associated with plexing would be developed. Once a composite term meeting the desired specification is formed in the window 224, a portion of the database corresponding with the portion selected in step 214 (FIG. 11) is scanned with step 231 by selecting the "Find" button of FIG. 15. More particularly, the search term is employed to find each page ticket among the selected job ticket pages which include the one or more values corresponding with the search criteria developed with the previously described steps. In step 232, page ticket numbers at which values corresponding with the search criteria are displayed in a suitable fashion in FIG. 14. By reference to the numbers displayed in the dialog of FIG. 14, selected page tickets corresponding with displayed numbers (steps 234, 236 and 238 can be conveniently reviewed in the windows 242a and 242b).

Referring to FIG. 13, one approach to replacing job characteristic values in an automatic fashion is shown. Using the job selector 213, a page ticket edit set is selected via step 244. The page numbers of the edit set are then buffered (step 246) and, at step 248 a first page ticket of the edit set is located through use of the windows 242 (FIG. 14) or the job ticket of FIG. 6, the values of the first page ticket located with step 248 is, in step 250, displayed. With the displayed first page ticket, one or more values are modified to correspond with replacement value(s) designated by the search term.

A suitable dialog for modifying at least one value is shown in FIG. 16. More particularly, a pull down menu for color is obtained and a cursor is moved to a suitable color. Referring to the pull down menu for color, it is believed that an improvement has been provided in that the colors programmed for the job being edited are actually provided in the menu. This not only reminds the user of the value types in the job, which in some cases can be quite extensive, but permits the user to make an easier correction if, for instance, "Paech" is to be changed to "Peach". The sort of pull down menu shown in FIG. 16 can be quite valuable in a search/replace routine since it permits access to pertinent job information and facilitates value replacement.

Each of the replacement values provided to the first page ticket of the edit set are, via step 254, buffered for use in an automatic replacement routine. In particular, suitable software, such as search/replace software available in Viewpoint® sold by Xerox Corporation, can be provided to locate other occurrences of the selected search term in the edit set by reference to page numbers buffered with step 246. In practice, such software would be provided with all the information, by way of steps 246, 254 and 256 necessary to keep track of which pages have been edited and would proceed with appropriate search and replace operations until each designated page has been edited with the buffered replacement value(s). If further job editing is required (step 258), the process loops back to step 212 of FIG. 11, otherwise a return is initiated.

It should be readily apparent from the description above that the approach of the disclosed embodiment permits convenient editing of a print job ticket. This sort of convenient editing is useful in a number of situations. In one example, a user may simply desire to change a given merge item or font type across a document. The current approach permits a fast and efficient way to locate where the editable value or values exist in the document and then to change those values with a minimum amount of effort. In another example, the approach permits search and replace operations to be performed with a complex search term. These sorts of operations are believed to be particularly desirable in the area of printing where editing of interrelated job characteristic values is common. As can be appreciated by those skilled in the art, the characteristics associated with fonts (e.g. family, size and weight, merge item characteristics) and finishing characteristics (e.g. rotating/stitching and binding) are well suited for the sort of complex searching mentioned above. As further indicated above, it may be particularly useful to search a characteristic value associated with one attribute and a characteristic value associated with another attribute in the same search term.

In another example, the above-described approach permits printing faults to be remedied readily. In particular, referring to FIG. 7-9, to print a program job, the same is typically moved from the job file 155 to the print queue 165. The job then moves up in the print queue until it is delivered to the printer 8 for production of prints based on programming instructions provided in the job ticket, and more specifically on the basis of programmed instructions for each page ticket of the job ticket. In the event that one or more job characteristic values dictated by the job cannot be fulfilled at the printer, a fault message is delivered to the printing machine user by way of, for example, the display of FIG. 15. In one contemplated embodiment, the fault message would include the pages at which one or more job characteristic values, which give rise to the fault condition occur. Preferably, the printing machine user would use the above-described editing approach to automatically revise those page tickets causing the faulted condition. It will be appreciated that through use of the above-described editing approach a printing fault, due to unsuitable programming, can be overcome readily.

What is claimed is:

1. In a printing system with a print engine for producing prints with a print job having a programmed job ticket, the print job including a document being represented by image data, the job ticket including a plurality of page tickets arranged in a numbered sequential order, each page ticket being associated with a set of printing instructions, the printing instructions including print job attributes with each print job attribute being associated with one or more print job characteristics, an improvement for automatically modifying one or more values of the job ticket, said improvement comprising:

a) a memory for storing each of the print job attributes and the print job characteristics being stored, as a set, a first value being mapped to one of the print job characteristics, prints being produced at the print engine with the stored image data and printing instructions;

b) a processor, communicating with said memory, for scanning a portion of the set of print job attributes and print job characteristics and determining each page ticket upon which the print job characteristic first value is located;

c) a user interface, including a display screen, for displaying a list of each number associated with each page ticket determined with said processor;

d) wherein at least one page ticket designated by said list is reviewed by a printing system user and a set of one or more page tickets is selected from the list of numbers displayed on said display screen; and e) a job ticket modifying subsystem for automatically modifying one or more print job characteristic first values, for the set of one or more page tickets, to one or more print job characteristic second values.

2. The improvement of claim 1, further including, reviewing one of the page tickets of the set of page tickets, manually changing a print job characteristic first value on the reviewed page ticket, and making the automatic modification of said f) on the basis of said manual change.

3. The improvement of claim 2, in which the print job characteristic first value is one of a plurality of values mapped to a common print job characteristic and said manual change is made with a pull-down menu, wherein the pull-down menu is configured to display each of the plurality of mapped values so that the printing system user is apprised of all the values associated with the common print job characteristic.

4. The improvement of claim 1, wherein said d) includes selecting a range of page tickets.

5. In a printing system with a print engine for producing prints with a print job having a programmed job ticket, the print job including a document being represented by image data, the job ticket including a plurality of page tickets arranged in a numbered sequential order, each page ticket being associated with a set of printing instructions, the printing instructions including print job attributes with each print job attribute being associated with one or more print job characteristics, an improvement for automatically modifying one or more values of the job ticket, comprising:

a) a memory for storing each of the print job attributes and the print job characteristics being stored, as a set, a first value being mapped to one of the print job characteristics, prints being produced at the print engine with the stored image data and printing instructions;

b) a processor, communicating with said memory, for scanning a portion of the set of print job attributes and print job characteristics and determining each page ticket upon which the print job characteristic first value is located;

c) a user interface, having a display screen, for displaying a list including each number associated with each page ticket determined with said processor;

d) wherein a set of one or more page tickets is selected from the list displayed on said display screen;

e) a job ticket modifying subsystem for automatically modifying one or more print job characteristic first values, for the set of one or more page tickets, to one or more print job characteristic second values;

f) wherein a third value is mapped to one of the print job characteristics, and, i) said processor further determines each page ticket upon which both the print job characteristic first value and the print job characteristic third value are located, and ii) for the set of one or more page tickets, said processor automatically modifies each print job characteristic third value to a print job characteristic fourth value.

6. The improvement of claim 5, wherein the print job characteristic first value and the print job characteristic third value are mapped to a common print job characteristic.

7. The improvement of claim 6, wherein, g) the print job characteristic is configured as a selected one of media type, media size and media color, h) each of the print job characteristic first value and the print job characteristic third value is configured as a common descriptor, the common descriptor being a selected one of a media type descriptor, a media size descriptor and a media color descriptor.

8. The improvement of claim 5, in which the print job characteristic value first value is corresponded with a first print job characteristic and the print job characteristic third value is corresponded with a second print job characteristic, wherein each of the first and second print job characteristics is associated with a common print job attribute.

9. In a printing system with a print engine for producing prints with a print job having a programmed job ticket, the print job including a document being represented by image data, the job ticket including a plurality of page tickets arranged in a numbered sequential order, each page ticket being associated with a set of printing instructions, the printing instructions including print job attributes with each print job attribute being associated with one or more print job characteristics, an improvement for automatically modifying one or more values of the job ticket, comprising:

a) a memory for storing each of the print job attributes and the print job characteristics being stored, as a set, a first value being mapped to one of the print job characteristics, prints being produced at the print engine with the stored image data and printing instructions;

b) a processor, communicating with said memory, for scanning a portion of the set of print job attributes and print job characteristics and determining each page ticket upon which the print job characteristic first value is located;

c) a user interface, having a display screen, for displaying a list including each number associated with each page ticket determined with said processor;

d) wherein a set of one or more page tickets is selected from the list displayed on said display screen;

e) a job ticket modifying subsystem for automatically modifying one or more print job characteristic first values, for the set of one or more page tickets, to one or more print job characteristic second values;

f) wherein the print job is transmitted to the print engine for production of the prints and the print job is faulted due to an inability of the printing system to process a print job having the print job characteristic first value, and, i) a printing system user is informed, with said display screen, that the print job has been faulted due to an inability of the printing system to process the job with the print job characteristic first value; and ii) the printing system user is provided with guidance, by way of said display screen, regarding a process required to achieve said automatic modification with both said processor and said job ticket modifying subsystem.

10. In a printing system with a memory and a print engine, a print job, with a programmed job ticket, being stored in the memory, the print job including a document being represented by image data, the job ticket including a plurality of page tickets arranged in a numbered sequential order, each page ticket being associated with a set of printing instructions, the printing instructions including print job attributes with each print job attribute being associated with one or more print job characteristics, each of the print job attributes and the print job characteristics being stored, as a set, in the memory, a first value being mapped to one of the print job characteristics, prints being produced at the print engine with the stored image data and printing instructions, an improvement for automatically modifying one or more values of the job ticket, said improvement comprising a method of:

a) scanning a portion of the set of print job attributes and print job characteristics;

b) determining, during said a), each page ticket upon which the print job characteristic first value is located;

c) buffering the number associated with each page ticket determined with said b);

d) displaying a list of the buffered page ticket numbers;

e) with the list of displayed, buffered page ticket numbers of said d), reviewing at least one page ticket designated by the list and selecting a set of one or more page tickets; and f) for the set of one or more page tickets, changing one or more print job characteristic first values automatically to one or more print job characteristic second values, wherein the need on the part of printing system user to manually change print job characteristic first values to print job characteristic second values is minimized.

11. The method of claim 10, in which a third value is mapped to one of the print job characteristics, wherein, g) said b) further includes determining each page ticket upon which both the print job characteristic first value and the print job characteristic third value are located, and h) for the set of one or more page tickets, changing each print job characteristic third value to a print job characteristic fourth value.

12. The method of claim 11, further including mapping the print job characteristic first value and the print job characteristic third value to a common print job characteristic.

13. The method of claim 12, further including:

g) configuring the print job characteristic as a selected one of media type, media size and media color; and h) configuring each of the print job characteristic first value and the print job characteristic third value as a common descriptor, the common descriptor being a selected one of a media type descriptor, a media size descriptor and a media color descriptor.

14. The method of claim 11, in which the print job characteristic value first value is corresponded with a first print job characteristic and the print job characteristic third value is corresponded with a second print job characteristic, further including associating each of the first and second print job characteristics with a common print job attribute.

15. The method of claim 10, wherein said f) includes:

(i) reviewing one of the page tickets of the set of one or more page tickets, (ii) manually changing a print job characteristic first value on the reviewed page ticket of said f)(i), and (iii) making the automatic changes of said f) on the basis of said manual change in said f)(ii).

16. The method of claim 15, in which the print job characteristic first value is one of a plurality of values mapped to a common print job characteristic and said manual change of said f)(ii) is made with a pull-down menu, further including configuring the pull-down menu to display each of the plurality of mapped values so that the printing system user is apprised of all the values associated with the common print job characteristic.

17. The method of claim 10, wherein said e) includes selecting a range of page tickets.

18. The method of claim 10, in which the print job is transmitted to the print engine for production of the prints and the the print job is faulted due to an inability of the printing system to process a print job having the print job characteristic first value, further including:

g) informing the printing system user that the print job has been faulted due to an inability of the printing system to process the job with the print job characteristic first value; and h) directing the printing system user regarding an employment of said a), e) and f) in eliminating the fault.

19. The method of claim 18, wherein at least one of said a), e) and f) is performed automatically.

* * * * *